United States Patent
Imran

(10) Patent No.: US 9,065,561 B2
(45) Date of Patent: Jun. 23, 2015

(54) SYSTEM AND METHOD FOR ENHANCING SPEECH OF A DIVER WEARING A MOUTHPIECE

(75) Inventor: Mir Imran, Los Altos Hills, CA (US)

(73) Assignee: InCube Labs, LLC, San Jose, CA (US)

( * ) Notice: Subject to any disclaimer, the term of this patent is extended or adjusted under 35 U.S.C. 154(b) by 534 days.

(21) Appl. No.: 13/466,031

(22) Filed: May 7, 2012

(65) Prior Publication Data

US 2013/0121113 A1    May 16, 2013

Related U.S. Application Data

(60) Provisional application No. 61/483,610, filed on May 6, 2011.

(51) Int. Cl.
| | |
|---|---|
| *H04B 13/02* | (2006.01) |
| *G10L 21/0364* | (2013.01) |
| *B63C 11/26* | (2006.01) |
| *H04B 11/00* | (2006.01) |
| *G10L 13/00* | (2006.01) |

(52) U.S. Cl.
CPC ............ *H04B 13/02* (2013.01); *G10L 21/0364* (2013.01); *G10L 2021/03643* (2013.01); *B63C 11/26* (2013.01); *H04B 11/00* (2013.01); *G10L 13/00* (2013.01)

(58) Field of Classification Search
USPC .......................................... 367/132; 340/850
See application file for complete search history.

(56) References Cited

U.S. PATENT DOCUMENTS

| | | | | | |
|---|---|---|---|---|---|
| 3,950,617 | A | * | 4/1976 | Dildy, Jr. ......................... | 381/54 |
| 4,342,104 | A | * | 7/1982 | Jack ............................... | 367/132 |
| 4,999,606 | A | * | 3/1991 | Comerford et al. ........... | 340/525 |
| 5,579,284 | A | * | 11/1996 | May .............................. | 367/132 |
| 7,269,266 | B2 | * | 9/2007 | Anjanappa et al. ........... | 381/151 |
| 7,477,207 | B2 | * | 1/2009 | Estep .............................. | 345/8 |
| 7,676,372 | B1 |  | 3/2010 | Oba | |

OTHER PUBLICATIONS

International Search Report and Written Opinion as received in corresponding application PCT/US2012/036845, dated Nov. 28, 2012.

* cited by examiner

*Primary Examiner* — Mark Hellner
(74) *Attorney, Agent, or Firm* — Mahamedi Paradice LLP

(57) ABSTRACT

Embodiments described herein provide a system, apparatus and methods to enable a diver to communicate more clearly with other divers or locations Embodiments process the speech to add clarity, or otherwise convert speech into an outputted form that is more intelligible e.g. so as to simulate the diver's unhindered speech. Embodiments provide hardware and software for receiving and recognizing hindered speech of a diver (e.g., speech hindered by a mouthpiece) and then augmenting the speech with generated output sounds corresponding to the intended speech sound or generating or replacing at least some of the diver's speech with synthesized words. The output sounds may be in the speaker's own voice or a synthesized voice. Embodiments may be configured to add clarity to and/or augment speech that is hindered by the wearing of a mouthpiece from a snorkel, SCUBA or other diving apparatus.

10 Claims, 17 Drawing Sheets

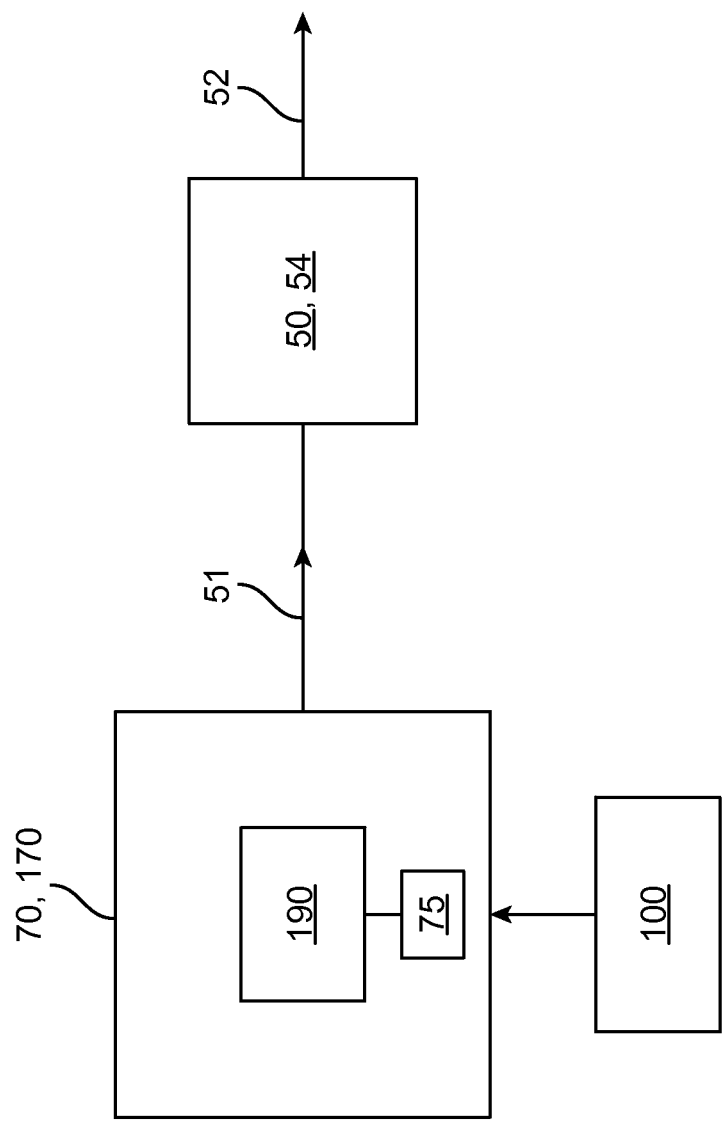

| Receiving Voice Input |
| --- |
| 1310 |

| Recognize Voice Input Speech | | |
| --- | --- | --- |
| 1320 | | |
| Word/Phrase matching | Phoneme Library | Waveform Analysis |
| 1322 | 1324 | 1326 |

| Voice Output | | |
| --- | --- | --- |
| 1330 | | |
| Underwater Signal to Receiver | Electrical Output | Blended Output |
| 1332 | 1334 | 1336 |

SYSTEM AND METHOD FOR ENHANCING SPEECH OF A DIVER WEARING A MOUTHPIECE

RELATED APPLICATIONS

This application claims priority to U.S. Provisional patent application Ser. No. 61/483,610 filed May 6, 2011; entitled SYSTEM AND METHOD FOR ENHANCING SPEECH OF A DIVER WEARING A MOUTHPIECE, which is fully incorporated by reference for all purposes.

This application is related to the following applications: U.S. patent application Ser. No. 13/398,718 filed, Feb. 16, 2012; entitled, Apparatus, System And Method For Underwater Signaling Of Audio Messages To A Diver"; U.S. patent application Ser. No. 13/231,881, filed Sep. 13, 2011; entitled, "Self-Propelled Buoy for Monitoring Underwater Objects"; U.S. patent application Ser. No. 13/237,912, filed Sep. 20, 2011; entitled, "Device, System and Method for Monitoring and Communicating Biometric Data of a Diver"; U.S. patent application Ser. No. 13/457,456, filed Apr. 26, 2012; entitled, "Mouthpiece for Measurement of Biometric Data of a Diver and Underwater Communication and U.S. patent application Ser. No. 13/352,249 filed Jan. 17, 2012; entitled, "Apparatus, System and Method for Underwater Voice Communication by a Diver," all of which are fully incorporated by reference for all purposes.

FIELD OF THE INVENTION

Embodiments described herein relate to a system for underwater voice communication. More specifically, embodiments described herein relate to a system and method for underwater communication by a diver, such as SCUBA or skin diver. Still more specifically, the present embodiments relate to a system for enhancing speech of a diver wearing a mouthpiece.

BACKGROUND

Since the early days of SCUBA (Self-Contained Underwater Breathing Apparatus) diving, communication between SCUBA divers has been an issue. This is due to the fact that the use of the SCUBA includes a mouthpiece worn by the divers which precludes direct voice communication. However, because of the risks involved in an underwater environment, divers have a critical need to communicate a variety of safety related messages to their fellow divers, e.g., communicating the amount of air they have remaining. As a result, a series of hand signs have been developed for underwater communication, but they only cover a very limited number of messages and cannot quickly get other divers' attention in critical situations. Various underwater graphical display devices have also been developed, but they have the same limitation as the hand signs. Furthermore, these devices which are worn on the diver's wrist or arm require the diver to divert his or her attention from what they are doing to look at the display. However, divers typically dive with their heads up to watch for their directions and with their arms besides their torsos to reduce the water resistance. Henceforth, the diver's natural diving position is not conducive to monitoring a visual alert on their wrist or elsewhere (e.g., arm or waist). This is even true for visual alerts being projected on the diver's face mask since the diver's attention is more focused on what is in front of them and not on what is projected on his or her face mask.

Acoustic alarm systems have also been developed, but they are code-based instead of voice-based. Therefore, such system can only communicate a limited number of messages and require the diver to understand their individual codes. Also, none of these devices provide for communication between divers and a surface craft such as a dive boat (a boat which transports and supports the divers). Further, none of these devices provides for communication between divers who are not in very close proximity. Thus, there is a need for an apparatus and an approach allowing for voice-based alerts to be communicated to the divers, for voice communication between divers while they are underwater, as well as for voice communication between divers and the surface craft.

BRIEF DESCRIPTION OF THE INVENTION

Embodiments described herein provide a system, apparatus and methods for underwater voice communication. One of the challenges of such a system is recognizing the speech of the diver when he or she is wearing a mouthpiece which limits the diver's the ability to pronounce various sounds. In some embodiments, an underwater communication system and/or device is provided to enable a diver (or other underwater person such as a snorkeler) to communicate more clearly with other divers or locations, such as surface boat locations.

Embodiments provide for the system including hardware and software for receiving and recognizing hindered speech ("hindered voice input") and then augmenting the speech with generated sounds ("voice output") corresponding to the intended speech sound or generating or replacing at least some of the diver's speech with synthesized words. The output may be in the speaker's own voice or a synthesized voice. In at least one embodiment, the hindered speech is made by a diver speaking with a mouthpiece in place. In an embodiment, the system comprises speech enhancement hardware to receive and recognize voice input, and to signal an output, in the context of an underwater breathing apparatus.

Embodiments include hardware, software or combinations thereof for processing obstructed spoken utterances of a diver who, under typical conditions, uses a mouthpiece and/or breathing apparatus that hinders and/or impedes normal speech. Embodiments process the speech to add clarity, or otherwise convert speech into an outputted form that is more intelligible (e.g. so as to simulate the diver's speech without obstruction from the mouthpiece).

In some embodiments, a device or apparatus is provided which includes memory resources (e.g. a buffer) for storing the diver's voice input. Further processing resources can be provided to recognize and substitute for obstructed or other unclear spoken utterances with speech output (synthesized or simulated) that corrects or otherwise clarifies the obstructed speech of the user.

In some embodiments, the voice output substitutes sounds where appropriate (e.g., by "blending" the substitutes with the originals) and plays back the blended speech as a whole so that the listener does not hear any breaks in the diver's spoken messages. For example, the module can include routines for removing or otherwise minimizing any pauses in the voice output so that the blended speech sounds continuous to the listener. In performing such an operation, the module can take a sampling of the diver's speech to determine the average interval between words and then use that to look for gaps which are larger than the average interval.

Still further, some embodiments allow a diver to speak and have two way voice communication with other divers and surface ships without having to remove their mouthpiece and without having any other specialized equipment. Such embodiments also allow the diver to communicate a full range of speech sounds to allow normal speech while the mouthpiece is in place. Embodiments of the invention also allow the diver to hear audio messages such as acoustic alarms, voice messages and prompts from a portable dive computer or other underwater electronic device. In use, such embodiments allow the diver to perform various tasks while receiving a variety of information including voice prompts and commands without having to look at a display, gauge or like device or apparatus. This enables the divers to stay focused on their task and/or their underwater environment, thus improving safety and their diving experience. Still other embodiments of the invention allow the diver to hear music, radio or other audio input while they are underwater. Still other embodiments can provide the diver with an acoustic input of sounds from the body of water in which he or she is diving allowing the diver to hear the sounds of underwater marine life as well as the sounds of surface craft.

An embodiment of a mouthpiece apparatus for underwater voice communication by a diver comprises a mouthpiece having an exterior coupling element for coupling to an air hose or other conduit of a SCUBA (or other underwater breathing apparatus) and an interior portion coupled to the coupling element and worn in the diver's mouth. The coupling element may be coupled directly to the air hose or to a fitting on the air hose. The coupling element and interior portion can include a lumen for the passage of respired air by the diver. The interior portion has a curved shaped corresponding to a shape of the diver's mouth and has attached right and left bite structures. The bite structures include upper and lower surfaces for engaging a bite surface of the user's upper and lower teeth. One or both of the bite structures may include a retaining flange which can be perpendicular to a bite surface of the bite structure for retaining the mouthpiece in the diver's mouth.

An acoustic transducer is positioned on the top surface of at least one of the left or right bite structures. The acoustic transducer is configured to transduce an electrical signal input (e.g., from another communication device or a dive computer) into an acoustic output and to acoustically couple to the diver's upper teeth in order to conduct the acoustic output from the diver's upper teeth through the diver's skull to generate audible sound in at least one of the diver's ears (e.g., to cochlea) when the diver is wearing the mouthpiece. Typically, the acoustic transducer is positioned to engage the upper (e.g., maxillary) back teeth of the diver's mouth, but may be positioned to engage any suitable tooth or group of teeth in the diver's mouth. Also, transducer properties can be tuned or otherwise adjusted. A microphone is positioned in or on the mouthpiece for detecting the diver's voice and generating an electrical output signal when the diver is wearing the mouthpiece. The microphone may be recessed or otherwise positioned to reduce breathing sounds. This microphone output can be sent to an underwater communication device for underwater transmission to another diver(s) or to a surface ship. In many embodiments, the communication device may correspond to an ultrasonic or other acoustical transmission device which transduces the electrical output signal into an acoustic signal, which is transmitted by the acoustical transmission device. Also, in various embodiments, one or both of the communication device or microphone may include a filter (e.g., high pass, low pass, etc.) for filtering out breath and related sounds of the diver from his or her spoken words.

In an exemplary embodiment of using the invention, the diver attaches an embodiment of the mouthpiece to a fitting on a regulator or other component of his or her SCUBA gear. For embodiments having electrical couplings on the mouthpiece, the diver may then connect them to the underwater communication device. He or she may perform a few quick tests to assure that the communication system is working. Such tests can include putting in the mouthpiece and saying some test phrases (e.g., "testing 1, 2, 3," etc.) while looking at a display on or coupled to the communication device to assure that a signal from the microphone is getting to the communication device. The test for the acoustic transducer can comprise putting in the mouthpiece and pressing a test signal button on the communication device which then sends a test signal to the acoustical transducer, which converts the electrical signal to an audio signal conducted through his teeth and skull, and which the diver then listens for. For either test, the diver can move the mouthpiece around in his or her mouth to find a position of the mouthpiece in their mouth which yields the best audio input and/or electrical output signal from the microphone. The diver may perform a similar procedure for embodiments of the mouthpiece used in a snorkel. Having found that position, the diver may select a particular acoustic frequency or range of frequencies (e.g., akin to a channel) to use for input (hearing) and output (verbal speech). The diver may choose to use the system underwater for voice communication with other divers as well as surface ship. Depending upon the frequencies available, the diver may then select/assign a distinct acoustic frequency or frequency range for a particular diver as well as for a surface craft. In many embodiments, the system will allow for separate frequency and/or frequency range to minimize cross talk from diver to diver as well as diver to surface ship communication. These and other aspects, embodiments and features are described in detail in the body of specification.

BRIEF DESCRIPTION OF THE DRAWINGS

FIG. 6c is a block diagram showing the configuration and operation of an embodiment of the acoustical transducer.

FIG. 13 is a simplified block diagram illustrating an embodiment including exemplary modules for recognizing voice input speech and producing voice output.

DETAILED DESCRIPTION OF THE INVENTION

Figure 1:
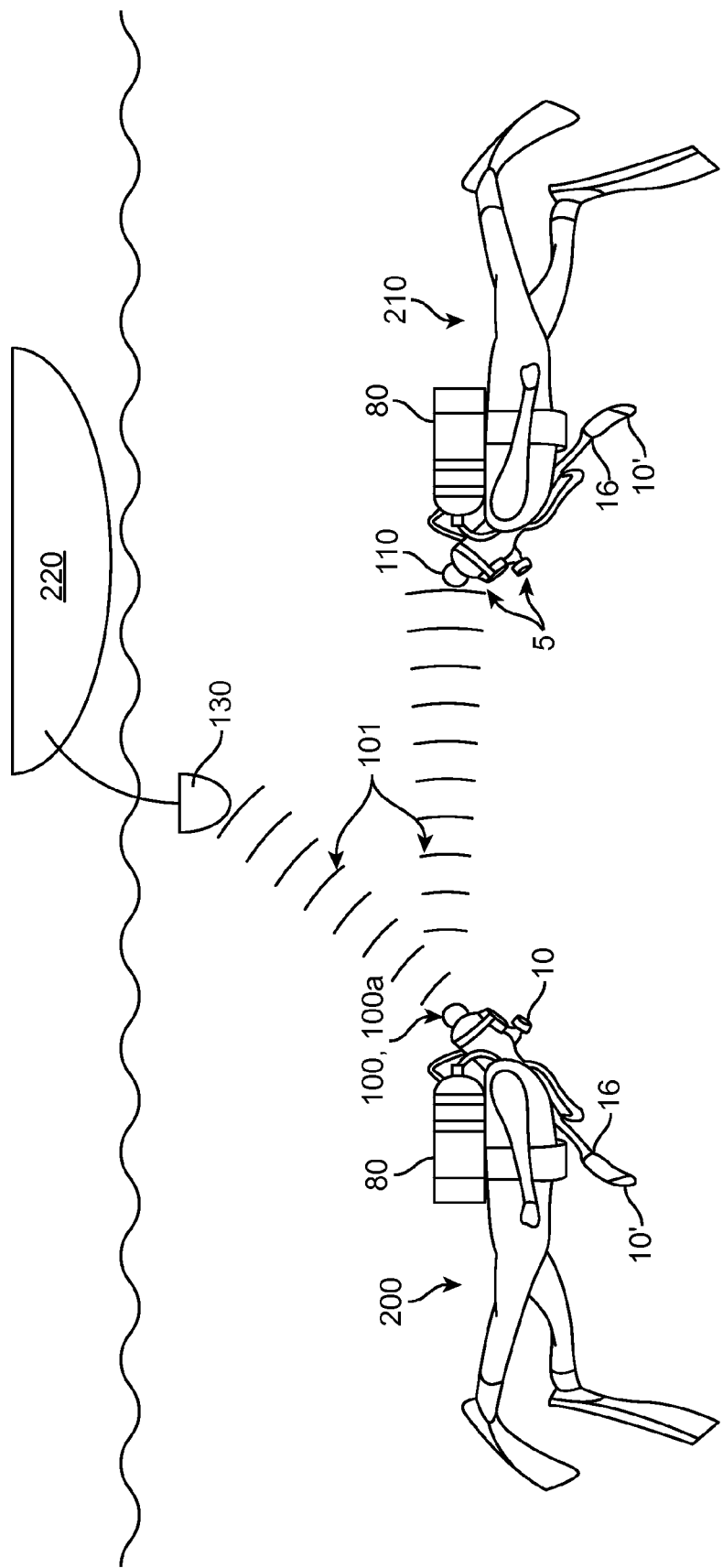
FIG. 1 is a schematic view of an embodiment of an underwater voice communication system for a diver.
Figure 1A:
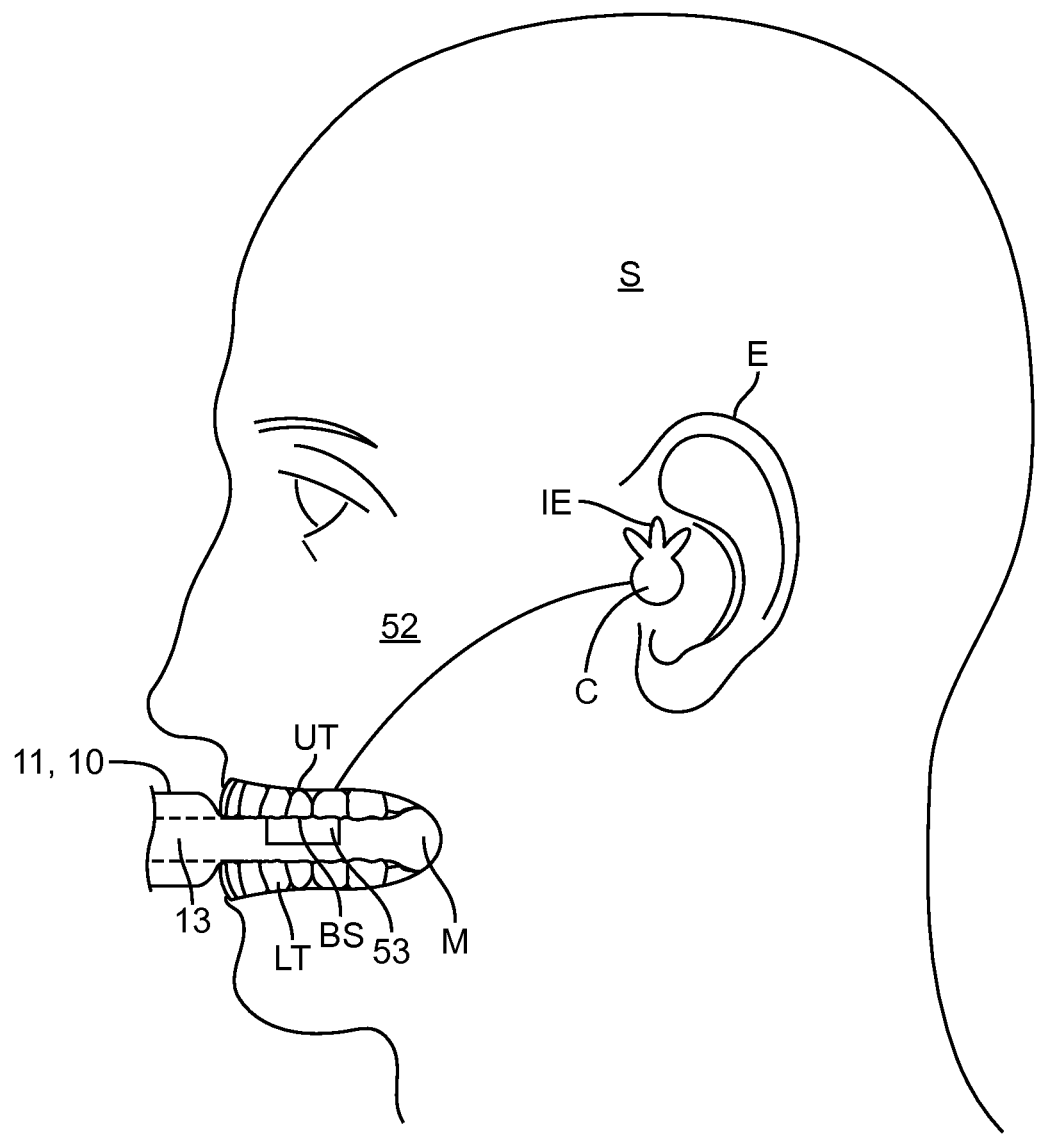
FIG. 1a shows an embodiment of a voice communication mouthpiece apparatus worn in the mouth and its use in the conduction of sound to the inner ear through the skull.
Figure 2:
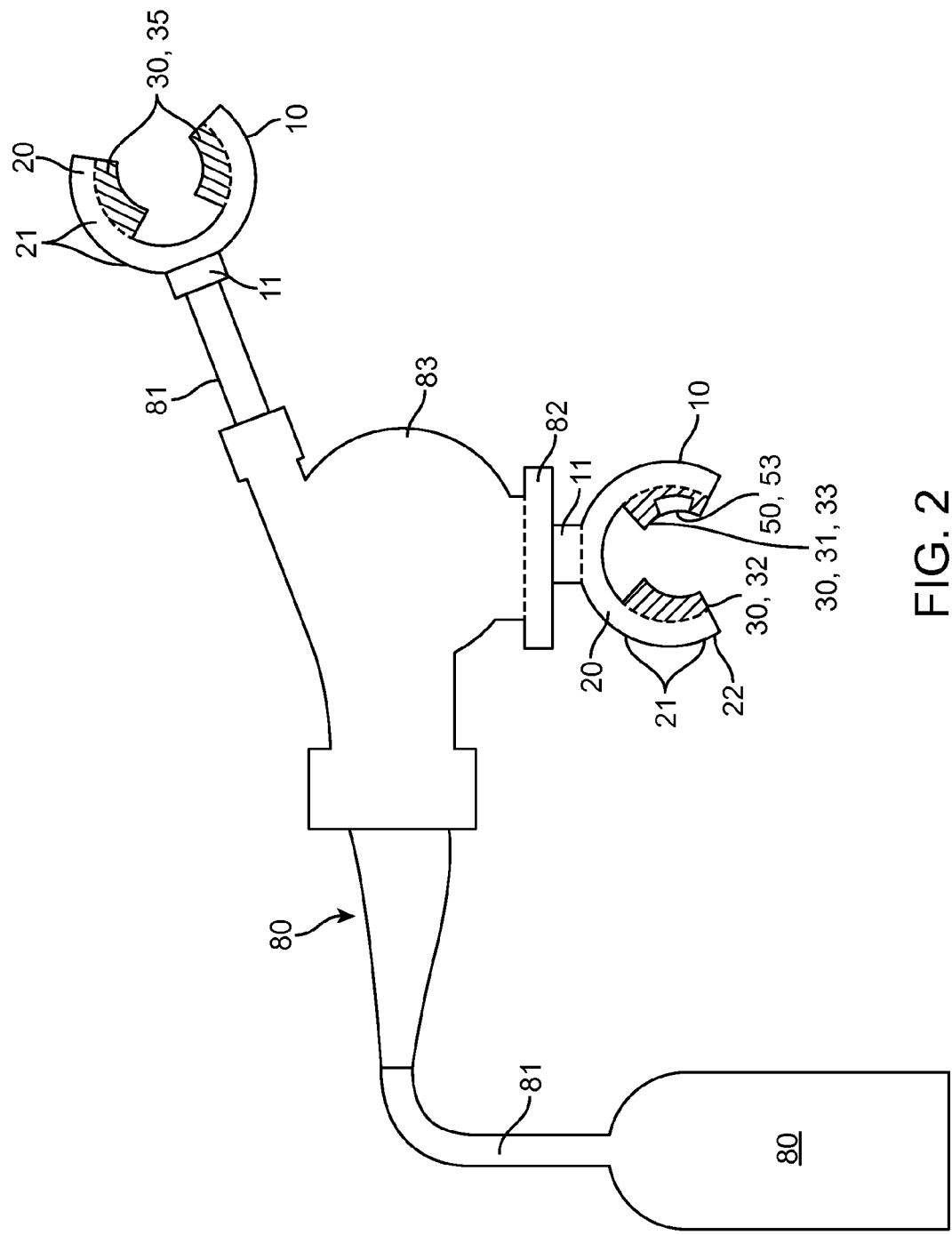
FIG. 2 is a lateral view illustrating embodiments of the mouthpiece coupled to an underwater breathing apparatus such as a SCUBA.
Figure 3:
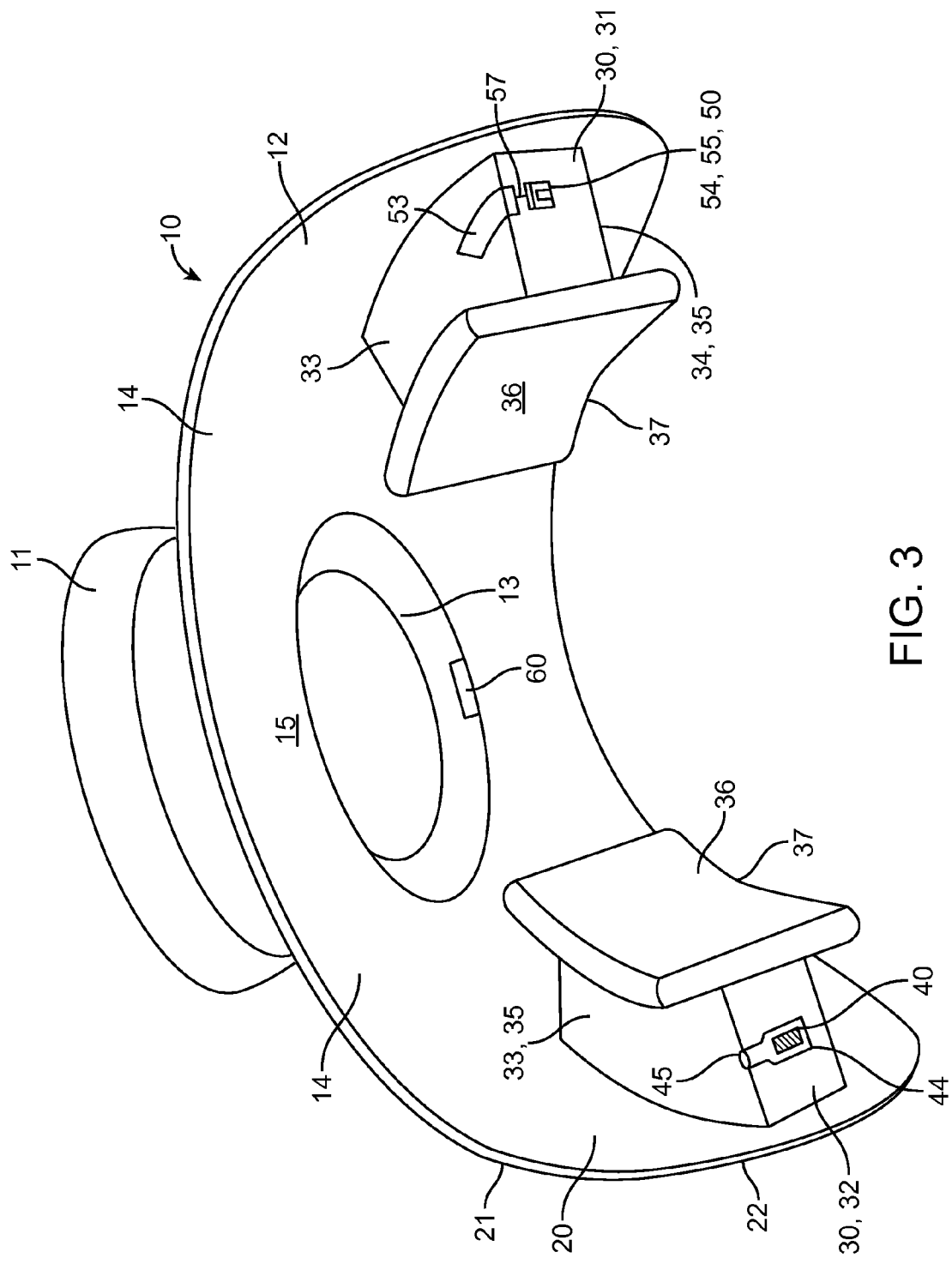
FIG. 3 is a perspective view showing various features of an embodiment of the mouthpiece.
Figure 4:
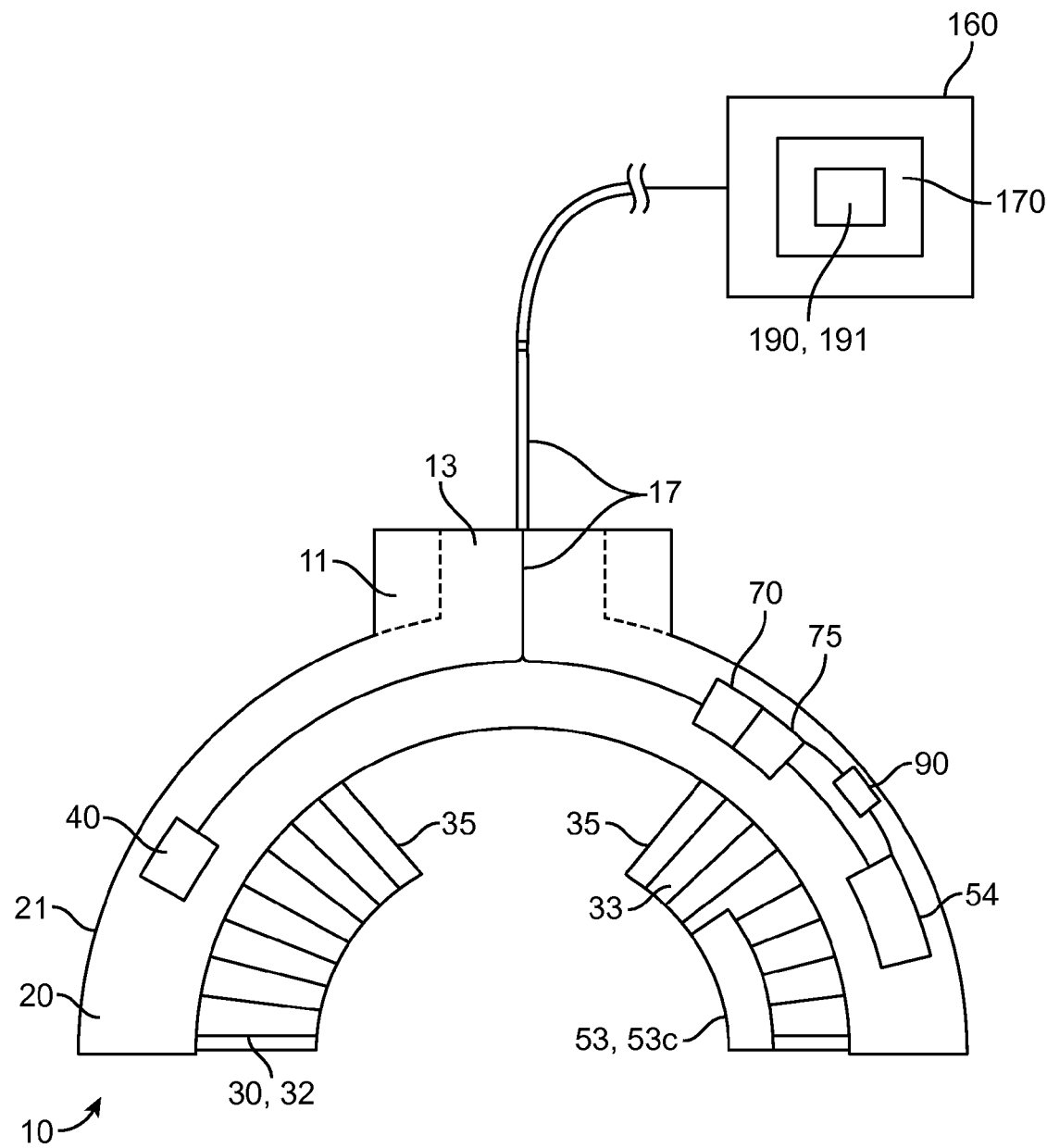
FIG. 4 is a lateral view showing an embodiment of the mouthpiece having an electrical connection means such as a wire for coupling to portable watertight electronic (PWE) devices such as a dive computer.
Figure 5A:
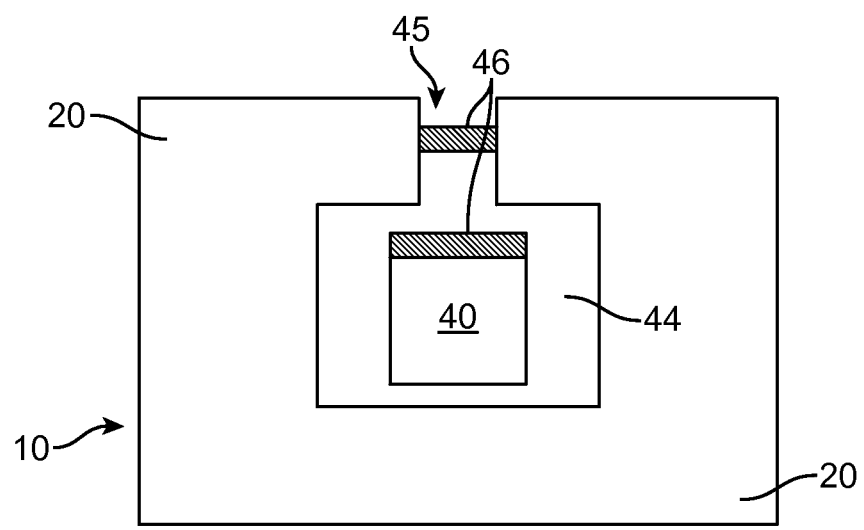
FIG. 5a is a side cut-away view showing an embodiment of the mouthpiece having a cavity and a microphone positioned in the cavity.
Figure 5B:
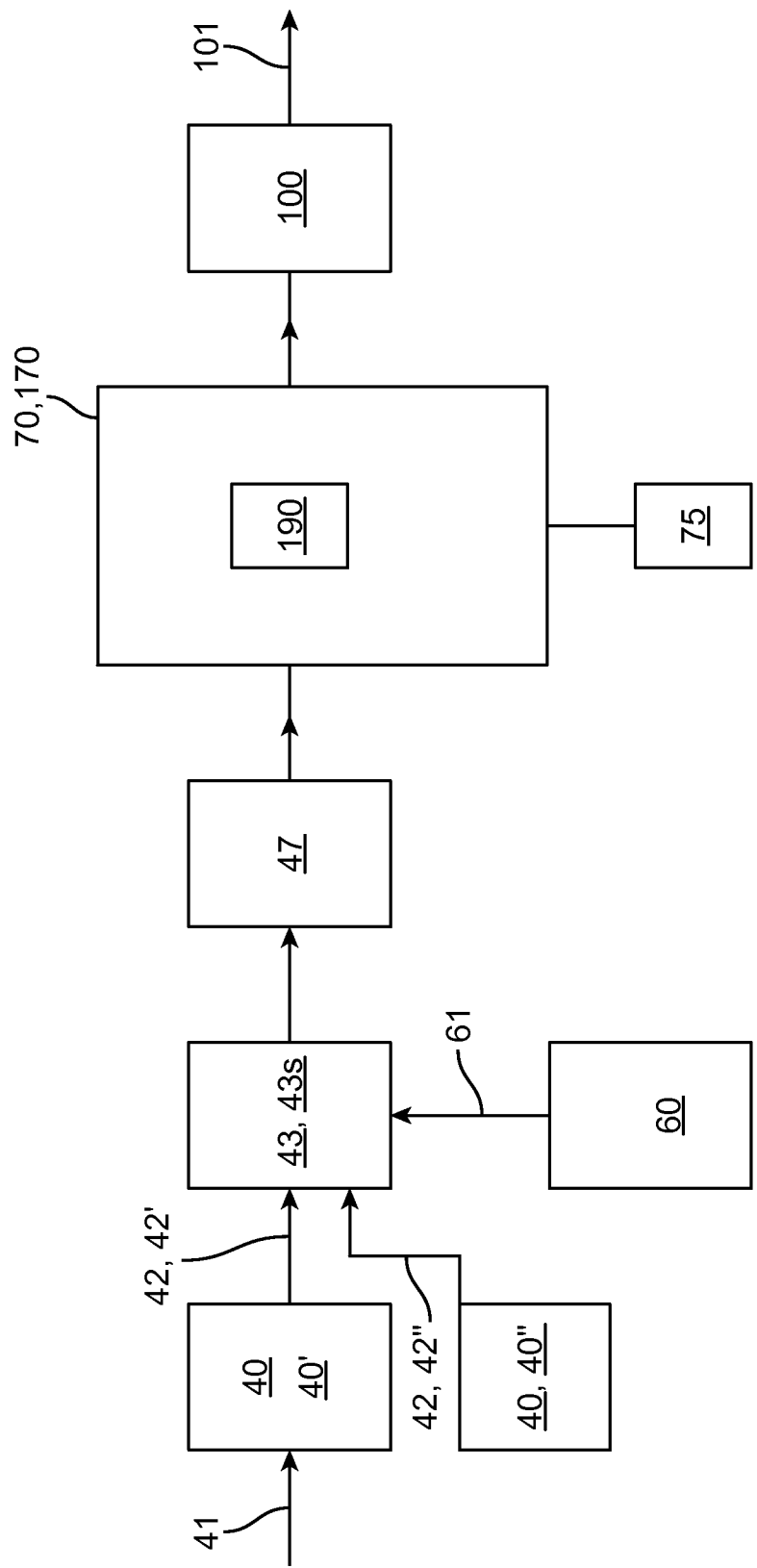
FIG. 5b is a block diagram illustrating the configuration and operation of an embodiment of the microphone.

Referring now to FIGS. 1-11, an embodiment of a communication system 5 for voice communication from a first diver 200 to one or more other divers 210 or surface ships 220 comprises a voice communication mouthpiece apparatus 10 (herein mouthpiece 10) and an underwater communication device 100. In various embodiments, communication system also provides for communication of computer generated voice messages to the diver from a portable underwater device. Mouthpiece 10 is worn in the diver's mouth and is configured to attach to a regulator 82 or other fitting 83 of a self-contained underwater breathing apparatus (SCUBA) 80 or other underwater diving apparatus. System 5, including mouthpiece 10, is configured to allow voice or other communication between a first underwater communication device 100 carried by diver 200 and a second underwater communication device 110 carried by other diver(s) 210 as well as between communication device 100 and a communication device 130 used by a ship 220. In one embodiment, communication device 130 can be incorporated into a buoy or array towed by ship 220. With regard to communication device 100 (and 110), it can be positioned on a variety of locations on the diver and/or on SCUBA 80. In one embodiment, it may be positioned on the diver's head and can be attached using a band or strap or it may be coupled to the hood of the diver's wetsuit. In many embodiments, communication device 100 may be incorporated into a portable watertight electronic (PWE) device 160 carried or worn by the diver as is described herein.

In addition to communication with another diver 210 having a separate SCUBA 80, in various embodiments, system 5 and mouthpiece 10 can also be adapted for communication with another mouthpiece 10' connected to a buddy breathing line 16 connected to same SCUBA 80 as used by diver 200 as is shown in the embodiment of FIG. 1. In such embodiments, mouthpieces 10 and 10' can be configured to both be operatively connected to the same communication device 100 or they may be configured to be directly connected to each other without the use of communication device 100. In use, such embodiments allow quick and ready communication between the diver 200 and a buddy breather without the need for any communication device or any set up procedure.

The mouthpiece 10 includes a coupling element 11, an interior portion 20 coupled to the coupling element 11, a microphone 40 and an acoustic transducer 50. Coupling element 11, couples the mouthpiece 10 to SCUBA 80. In various embodiments, coupling element 11 may be configured to couple directly to an air hose 81 of SCUBA 80 or a regulator 82 or other fitting 83 of SCUBA 80. The coupling element 11 and the interior portion 20 include a lumen 13 for the passage of respired air by the diver.

One or both of the microphone 40 and the acoustic transducer 50 may be powered by a battery 90 which is incorporated into the mouthpiece 10 or coupled to the mouthpiece 10, for example, by an electrical wire 17 or other electrical connection means. Battery 90 may comprise various lithium buttons or other suitable batteries such as miniature batteries known in the art. Battery 90 may also be shaped to have a form factor which readily fits into mouthpiece 10. For example, in one embodiment, battery 90 may have curved shape which corresponds to the curvature of the diver's dental arches DA. Battery 90 may also be used to power a processor 70 that may also be contained in the mouthpiece 10.

Wire(s) 17 may also be configured to couple both the microphone 40 and the transducer 50 (as well as other suitable electrical components of mouthpiece 10) to various electrical devices that are part of SCUBA 80 or are otherwise worn or carried by the diver, such as communication device 100 and/or a dive computer 160. Wire(s) 17 may be insulated sufficiently to withstand depths of several hundred feet or more. A portion of the wires 17 may be embedded in the mouthpiece 10 and/or connected to the mouthpiece 10 by an electrical connector configured for underwater conditions. Wire 17 can include at least a first and second wire for connection to the microphone 40 and the acoustic transducer 50. In some embodiments, a section of wire 17 may pass through lumen 13 of coupling element 11 so as to connect to one or more electrical devices that are part of SCUBA 80 or are otherwise worn or carried by the diver. In such embodiments, wire 17 is sufficiently thin or otherwise configured so as to not interfere or impede the passage of respired air through lumen 13.

In alternative or additional embodiments, one or both of the microphone 40 and the transducer 50 may be operatively coupled to communication device 100 and/or dive computer 160 via use of a wireless communication device, such as a radio frequency (RF) communication chip 95. RF communication chip 95 may correspond to an active or passive RF transceiver and may be embedded in the mouthpiece 10. The frequency and power levels for use with such an RF communication chip 95 can be adapted for underwater use to allow communication of signals 97 between the RF communication chip 95 in the mouthpiece 10 and a corresponding chip 96 in communication device 100 and/or dive computer 160 carried by the diver. In use, such embodiments, allow the diver to couple the mouthpiece 10 to communication device 100 and/or computer 160 without having to make any physical connections. They also allow the diver to verify that the mouthpiece 10 is operating properly before getting into the water through the use of one or more diagnostic software modules 190 resident within dive computer 160. The software modules 190 can be configured to interrogate mouthpiece 10 for proper operations. In one embodiment, this may consist of the diver being prompted to speak several test phrases with the mouthpiece in place. Further, in various embodiments, communication chip 95 may include memory resources 75 coupled to chip 95 and may contain various diver specific information (e.g., name, weight, health data, dive history etc.), which can be signaled to dive computer 160 allowing the dive computer to uniquely identify the mouthpiece 10 as belonging to a particular diver and then upload that data into the dive computer 160. The process may also be facilitated by use of a processor 70, such as microprocessor 70, which controls the handshake and other communication between communication chip 95 and chip 96. Processor 70 may also be coupled to memory resources 75. In particular embodiments, such a configuration can be implemented through use of an ASIC (application specific integrated circuit) containing processor 70, and memory resources 75

The interior portion 20 of the mouthpiece 10 has a curved shape 21 corresponding to a shape of the diver's dental arches DA and has attached a right bite portion 31 and a left bite portion 32. Together, the right bite portion 31 and the left bite portion 32 form bite structures 30. The curved shape 21 may be fabricated by taking a dental impression or image of the diver's mouth and then using that impression or image to construct a mold for making the mouthpiece and/or using stereolithography techniques known in the art. The bite structures 30 include an upper surface 33 and a lower surface 34, which together form bite surfaces 35. The bite surfaces 35 are for engaging a bite surface BS of the diver's teeth T, including the diver's upper teeth UT (also called maxillary) and lower teeth LT. Bite structures 30 may be positioned and arranged to contact at least the back teeth of the diver, but may contact the front teeth or other teeth as well. The bite structures 30 may also be acoustically isolated from each other by fabricating all or a portion of the bite structures from various acoustically insulating materials known in the art.

In various embodiments, one or both of the bite structures 30 may include a retaining flange 36 for retaining the mouthpiece in the diver's mouth M by contacting an inside surface of the diver's teeth. Typically, flange 36 will be oriented perpendicular to bite surfaces 35, but other orientations are also contemplated (e.g., an acute angle). Also, flange 36 may have a curved shape or profile 37 which corresponds to the curvature of the diver's dental arches DA.

In various embodiments, mouthpiece 10 may be fabricated from elastomeric polymers such as silicone, polyurethane, copolymers thereof and other elastomers known in the art. The mouthpiece 10 may have a unitary construction and or may be fabricated from separate components which are joined. It may be fabricated using various methods known in the polymer processing arts, including molding and stereolithography methods. Also, molding may be done with the microphone 40 and/or acoustical transducer 50 in place, or they may be added to cavities created in the mouthpiece 10 for their positioning. The polymeric materials for the mouthpiece 10 may be selected for several different mechanical and acoustical properties. For example the material can be selected to achieve a desired durometer for the mouthpiece 10. The durometer of the material may be selected to maintain the shape of the mouthpiece 10, but at the same time, reduce the bite force required for the diver to hold the mouthpiece 10 in place. Suitable lower durometer embodiments, include the range of 20 to 50, more preferably, 30 to 40. In use, such lower durometer embodiments allow the diver to keep the mouthpiece 10 in their mouth for extended periods (e.g., hours) without excessive discomfort or fatigue of their jaw muscles, particularly while speaking. The properties of the polymers used for the mouthpiece 10 can also be selected to obtain a desired amount of acoustical insulation so as to minimize the transmission of sound from transducer 50 to microphone 40 so as to reduce or prevent feedback between the two.

In some embodiments, the mouthpiece 10 having a lower durometer can be achieved by two ply and/or other multilayer configurations of the mouthpiece 10 where at least a portion of the mouthpiece 10 comprises a lower durometer tooth contacting surface layer 18 (also referred to as a liner) which fits over a higher durometer (e.g., more rigid), underlying core structure 19. The latter provides sufficient rigidity for holding the shape of the mouthpiece 10 in the diver's mouth, while the former provides a soft comfortable tooth contacting surface. Liner 18 may also be configured to provide acoustical insulation/dampening properties so as to reduce feedback between microphone 40 and transducer 50 by reducing the transmission of sound from transducer 50 and microphone 40. In use, such two ply or other multilayer embodiments of the mouthpiece 10 provide a more comfortable mouthpiece and one that minimizes or reduces feedback from the transducer 50 and microphone 40, while maintaining the shape of the mouthpiece. In related embodiments, mouthpiece 10 can have a three or even a four ply construction to provide additional amounts of acoustic insulation.

Microphone 40 is positioned in or on mouthpiece 10 and is configured to detect the sound 41 (herein voice sounds 41) from the diver's voice with the mouthpiece 10 in place and generate an electrical output 42. Microphone 40 may comprise various miniature microphones known in the art and may comprise various electric microphones known in the art. The microphone 40 may include or be coupled to a preamplifier 47 as well as a filter device 43 for filtering out the diver's breath sounds or other non-speech related sounds (e.g., bubble and cavitation sounds). In various embodiments, filter 43 may correspond to one or more of a high pass, low pass or band pass filter. Filter 43 may also be programmable to allow the user to select various acoustic criteria for filtering out breathing sounds. Such criteria may include a particular frequency range, duration of sound and/or amplitude of sound that is filtered. Filter 43 may also be configured to filter out acoustic signals 52 (discussed below) generated by acoustical transducer 50 so as to minimize feedback from transducer 50 and microphone 40. In an alternative or additional embodiment, filter 43 may also be configured as or include a switching device 43s that shuts off the generation of signals 42 by microphone 40 when the diver is receiving signal acoustic signals 52 from transducer 50. In use, such embodiments provide another approach and means for minimizing or eliminating feedback between microphone 40 and acoustic transducer 50.

Microphone 40 may be placed in any number of locations in or on the mouthpiece 10. According to the present embodiments, microphone 40 is placed on an opposite side 22 of the mouthpiece to the side that contains acoustic transducer 50 so as to minimize feedback between the microphone and acoustic transducer 50 (side 22 being defined by the diver's left and right). In particular embodiments, the microphone is placed on the opposite bite structure 30 from that of acoustic transducer 50. In such embodiments, bite structure 30 is configured to dampen or attenuate any vibrations coming from acoustical transducer 50. Also, microphone 40 may also be placed on the surface 12 of mouthpiece 10, but is more preferably recessed within the mouthpiece so as to attenuate breath sounds as well as reduce the likelihood of exposure to liquids in the diver's mouth.

In the embodiments of the mouthpiece 10 having a recessed microphone 40, the mouthpiece 10 can include a cavity 44 in which the microphone 40 is placed. The cavity 44 may include a small aperture 45 or opening to the mouthpiece surface 12 to allow for acoustical conduction to the mouthpiece 10. The diameter of aperture 45 can be selected to minimize the entry of fluids into the cavity, and in various embodiments, can be in the range of 0.001 to 0.00001 inches (0.00254 to 2.54e-005 centimeter), and more preferably, 0.0005 to 0.0008 inches (0.00127 to 0.002032 centimeter). In a specific embodiment, the diameter of aperture 45 is 0.0007 inches (0.001778 centimeter). One or both of aperture 45 and microphone 40 may include a waterproof layer 46, which may correspond to a porous material such as an expanded polytetrafluoroethylene (PTFE) material. Also, in the embodiments of the mouthpiece 10 having the cavity 44, the microphone 40 may also be potted in cavity 44 with a sound insulating material, such as one or more curable polymers having sound insulating properties (e.g., silicone). In use, such embodiments having the potted microphone 40 provide a means for reducing feedback between microphone 40 and acoustic transducer 50 as well as for dampening of other unwanted sounds (e.g., from the diver clenching his jaw on the mouthpiece), which may be conducted through mouthpiece 10.

Acoustic transducer 50 is positioned on the upper surface 33 of at least one of the left and/or right bite structures 30. The acoustic transducer 50 is configured to transduce an electrical signal input 51 (encoded or corresponding to an acoustic signal) received by the diver's communication device 100 into an acoustic output signal 52. Input signal 51 can be from one or more of another communication device 100 (e.g., carried on either another diver or a surface ship), a dive computer, a music player (e.g., an MP3 player) or other related devices. In particular embodiments, input signal 51 can be generated and/or conditioned by a processor 170 (described herein below) or other signal conditioning device or circuitry of communication device 100 or a processor 70 resident within mouthpiece 10. Processor 70 or 170 may correspond to a microprocessor and can be configured to generate, and/or condition signal 51, as well as condition signal 42 from microphone 40. Such signal conditioning in either case can include one or more of amplification, filtering, conversion, matching and isolation.

Transducer 50 is also configured to acoustically couple to the diver's upper teeth UT to conduct the acoustic output 52 from the diver's upper teeth through the diver's skull S to the diver's cochlea in order to generate audible sound in at least one of the diver's ears E when the diver is wearing mouthpiece 10. In many embodiments, the transducer 50 comprises an acoustical plate 53 (or a vibrating plate) coupled to a driver 54. The plate 53 is configured to engage with and is acoustically coupled to the surface of the diver's teeth. The plate 53 is to be vibrated by the driver 54 responsive to electrical signal 51. Vibration of the plate 53 produces acoustical signal output 52 which is acoustically conducted to the diver's teeth and then through the bones in his or her skull S to the inner ear IE including cochlea C where they are perceived as sound. Plate 53 can be fabricated from ceramic, metal, polymeric material such as a resilient polymer, and can have a size and shape to acoustically couple to one or more of the diver's teeth. In particular embodiments, plate 53 may have a curved horizontal shape 53c corresponding at least in part to the curvature of the diver's dental arches DA to facilitate the plate contacting multiple teeth. Plate 53 may also have one or more ridges or other raised feature 53r configured to enhance acoustical coupling and conduction to the diver's teeth. In particular embodiments, ridges 53r can be positioned to contact the center depressions in the diver's teeth.

In particular embodiments, plate 53 can be configured to have an acoustical impedance approximating or otherwise matched in a certain fashion (e.g., proportional, inversely proportional, etc.) to that of the diver's teeth (e.g., one or more of the upper teeth). Such embodiments can be achieved by fabricating plate 53 from one or more dental ceramics or other material having similar mechanical properties as the diver's teeth. Other acoustic properties can also be so matched such as the resonant frequency of the plate and the teeth. Such matching of acoustic properties can be configured to minimize acoustic losses from plate 53 to the teeth or otherwise enhance conduction of acoustic signal 52 through the diver's skull S to the inner ear IE including the cochlea C.

In various embodiments, driver 54 comprises an electromagnetic driver 55, which can be directly or indirectly coupled to plate 53. In the embodiments that driver 55 is indirectly coupled to plate 53, driver 54 comprises the electromagnetic driver 55, a movable diaphragm 56 sitting atop or otherwise coupled to the driver 55, and a lever 57 or other connecting means coupling diaphragm 56 to plate 53. Electromagnetic driver 55 can comprise various electromagnetic drivers known in the speaker or earphone arts and can comprise a miniature magnet 58 which may correspond to a core or coil. One or more of driver 55, movable diaphragm 56, lever 57 and magnet 58 can be fabricated from microelectro-mechanical-systems-based (MEMS-based) components either separately or as a single structure. In alternative embodiments, driver 55 may be configured to be directly coupled to plate 53 without diaphragm 56 and/or lever 57.

Typically, acoustic transducer 50, including plate 53, is positioned to engage the upper (e.g., maxillary) back teeth of the diver's mouth M, but may be positioned to engage any suitable tooth or group of teeth in the diver's mouth such as the front either upper or lower teeth. As an addition or alternative embodiment, transducer 50 including plate 53 may also be configured to engage with and be acoustically coupled to the diver's upper palate (the hard palate). In such embodiments, the plate 53 can have a curved shape matched to at least a portion shape of the upper palate (also known as the roof of the mouth). Such embodiments allow for larger surface area of acoustical conduction to the diver's skull and do not require the diver to bite down on the mouthpiece when speaking.

In various embodiments, mouthpiece 10 can include a sensor 60 which is configured to detect the diver's breath and generate an output signal 61, which is used to switch off microphone 40 and/or to attenuate or gate the output signal 42 coming from the microphone to communication device 100 during a time period of the diver's respiration (e.g., like a squelch function). In the first configuration (where the microphone is switched off), the output signal 61 can be fed into microphone switching device 43s, and in the second signal 61 can be sent to communication device 100 including processor 170. In many embodiments, sensor 60 can correspond to a miniature flow/velocity sensor for detecting a flow rate and/or velocity of the diver's breath moving through the mouth. When the velocity or flow rate exceeds a threshold value, corresponding to flow rate or velocity of the diver's breath, the microphone 40 can be configured to shut off, and/or output signal 42 can be attenuated or gated by processor 170. The threshold value for flow rate and/or velocity can be selected so as to be able to distinguish between a velocity or flow rate when the diver is speaking or breathing, the former being lower than the latter. In various embodiments, processor 170 and/or microphone 40 may include logic for shutting off the microphone 40 and/or attenuating or gating signal 42 or 51. In specific embodiments, such logic for attenuating or gating signal 42 or 51 can be incorporated into one or more modules 190

For embodiments where sensor 60 comprises a flow sensor, the sensor can be positioned in a variety of locations on mouthpiece 10 for detecting the divers' breath. In preferred embodiments, flow/velocity sensor 60 is placed toward the front section 14 of the mouthpiece 10 (e.g., near the front teeth), preferably in the center 15 of the front section 14, so as to be in a location in the diver's mouth having the greatest velocity/flow rate (for example, at the peak of a velocity profile such as a velocity profile for Poiseuille flow). Such profiles can be determined using standard measurement methods known in the art for a standard mouth shape, size and tidal volume (or other related respiratory measurement), with adjustments made for a particular individual.

Figure 10:
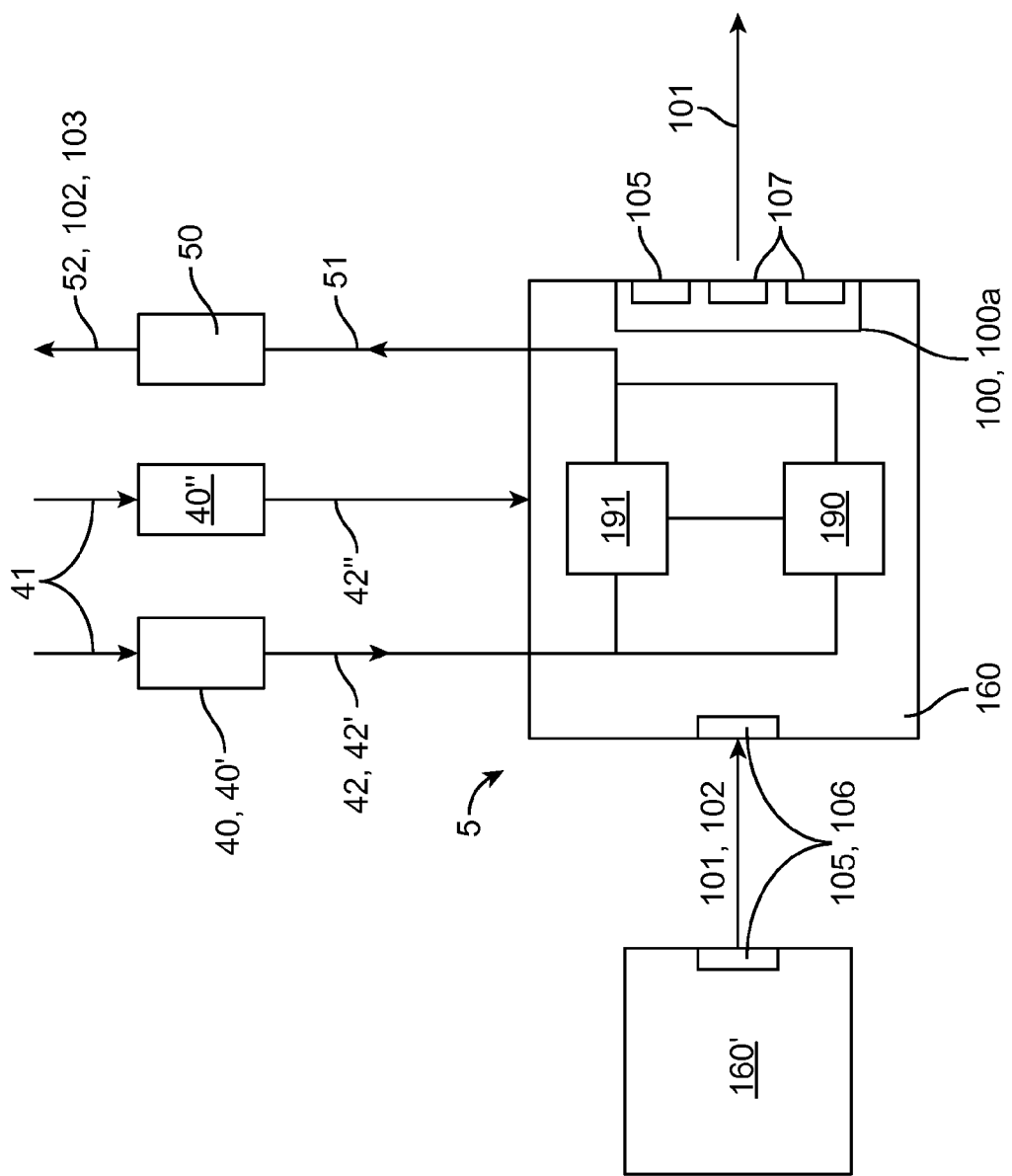
FIG. 10 is a schematic view illustrating the configuration and operation of an embodiment of the communication device for use with embodiments of the voice communication mouthpiece apparatus.

Communication device 100 can employ a variety of communication modalities including, for example, electromagnetic, RF, magnetic, optical, acoustical and/or combinations thereof. Referring now particularly to FIG. 10, in the preferred embodiments, the communication device 100 can correspond to an ultrasonic or other acoustical transmission device 100a which transduces the electrical output signal 42 into an acoustic signal 101, which is transmitted by the acoustical transmission device 100a. In such embodiments, communication devices 100 can comprise one or more acoustical transducers 105 which transmit and/or receive acoustical energy at a selected frequency or range of frequencies. Selected frequencies can be in the range of 10 to 40 kHz, 30 to 40 kHz, 100 to 200 kHz and 150 to 200 kHz. This frequency can be adjusted for one or more of the depth, salinity and temperature conditions of the water. Acoustical transducers 105 may correspond to one or more ultrasonic transducers 106, which can comprise various piezo-electric materials, such as piezo-electric ceramic materials. The particular acoustical transducer 105 and acoustical frequency can be selected based on the desired acoustical transmission range, acoustical sensitivity, bandwidth, maximum diving depth, temperature and salinity conditions and related parameters.

Also, acoustical transducers 105 may be configured as both acoustical transmitters and receivers so as to send and receive acoustical signals. In many embodiments, transducers 105 can be arranged as an array 107 of transducers which may include a phased array formation. Array 107 can be configured to optimize one or more of the transmission range, sensitivity and bandwidth of communication device 100. In various embodiments, the frequency, power settings and sensitivities of transducers 106 and/or array 107 can be selected to enable underwater transmission ranges for communication device 100 up to 1500 feet (457.2 meters) and more preferably, up to 2500 feet (762 meters) or even great transmission ranges. Also, communication device 100 can include signal generation and selection circuitry to allow for communication over multiple selectable acoustic frequency ranges, herein after channels. Communication device 100 may also include a multiplexing device (not shown for simplicity) coupled to at least one of the transceiver or signal processing circuitry so as to allow for the transmission and/or receiving of multiple signals. The multiplexing device may be configured for one or more of time division, frequency division or code division multiplexing. In alternative embodiments communication device 100 can comprise an RF based device and can even include RF communication chip 95 described above. In these and related embodiments, RF communication chip 95 is configured to have a selected power and frequency to enable underwater communication with other divers 210 and ship 220.

Figure 11:
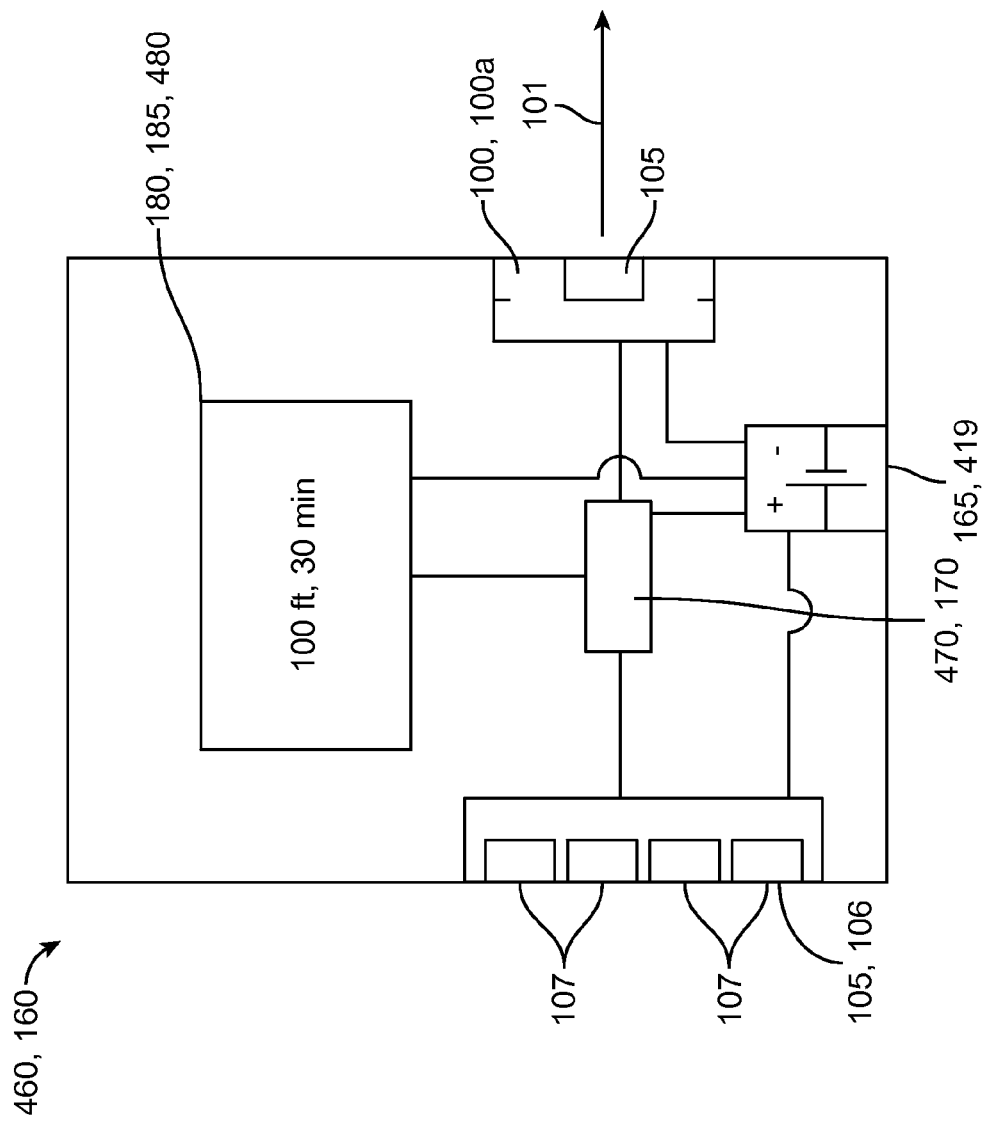
FIG. 11 is a schematic view illustrating the configuration and operation of an embodiment of a PWE device including a communication device for use with embodiments of the voice communication mouthpiece apparatus.

Referring now to FIG. 11, in many embodiments, communication device 100 can be incorporated into a portable watertight electronic (PWE) device 160. PWE device 160 will typically comprise a PDA (Personal Digital Assistant) device or other similar device that is worn or carried by diver 200. PWE device 160 may also comprise or be integrated into a dive watch, dive computer or other device or equipment carried by the diver, e.g., a flash light, depth gauge, regulator etc. For ease of discussion, PWE device 160 will now be referred to as a dive computer 160; however, other embodiments are equally applicable. Dive computer 160 includes a processor 170, display 180, user input means 185 and an electrical power source 165. Power source 165 may correspond to a portable battery such as a lithium or lithium ion battery or other batteries known in the art. User input means 185 may correspond to a touch screen which may be separate from or integral with display 180. Processor 170 includes one or more modules 190 including software programs or other logics for controlling various operations of device 160 including those of communication device 100. For example, in various embodiments, module 190 can comprise a program for discriminating between when the diver is speaking versus breathing using an output 61 from sensor 60 and then gate or attenuate microphone output 42 and/or transducer output 51 accordingly.

In other embodiments, module 190 can comprise a program or other logic instruction sets for generating and sending various voice commands and other voice messages 102 to the diver to alert them of various conditions and/or assist them in the performance of one or more tasks. In one embodiment, module 190 can comprise a program for the diver performing a controlled ascent whereby the program sends voice prompts to the diver telling them how long to remain at a particular depth before they can ascend to the next depth so as to avoid decompression sickness (also known as "the bends" or "divers' disease") or other related conditions. The program can be configured to send the prompts in response to one or more inputs such as those from an electronic depth gauge, electronic timer, SCUBA tank pressure or related gauge or sensor. Other inputs can include various messages from other divers 210 as well as the dive boat or other surface ships 220.

The processor 170 will typically correspond to one or more microprocessors known in the art and can be selected for increased durability, fault tolerance and pressure resistance for underwater operation, using various military-specification (MIL-SPEC) criteria known in the military/naval equipment arts. Processor 170 will typically include one or more modules or algorithms 190 for generating, conditioning and controlling signals sent to and from the mouthpiece 10, including signals 102 corresponding to voice messages as well as controlling other operations to allow two way voice communication by diver 200. Modules 190 may also be configured for computing, monitoring and communicating various physiological data of the diver, including for example, heart rate, respiration rate, blood pressure, blood oxygen saturation and other blood gas measurements (e.g., blood nitrogen). Processor 170 may also include other modules 190 which use such data to determine if the diver is in a state of physiologic stress (e.g., such as stress caused by low blood oxygen levels, "hypoxia," or out gassing of nitrogen, "decompression sickness") or a precursor state which precedes or is otherwise predictive of a state of physiological stress. When such a stress state or precursor state of stress is detected, it may be communicated by the first communication device 100 to a second communicative device 110 to allow other individuals (such as those on the dive boat 220 or even those onshore) to monitor the diver(s) and alert them when it is time to ascend and/or if diver requires assistance.

In particular embodiments, PWE device 160 can comprise a dive computer or a related device that is carried or worn by the diver and is configured to provide the diver 200 various voice messages 102 (also referred to as spoken messages 102)

including alerts, prompts and commands using mouthpiece 10 and acoustic transducer 50. This can be achieved through the use of processor 170, audio signal generator 176, and one or more modules 190 that are configured to generate and signal voice messages to the diver in response to one or more conditions and/or as part of a voice instruction set to the diver.

Figure 6A:
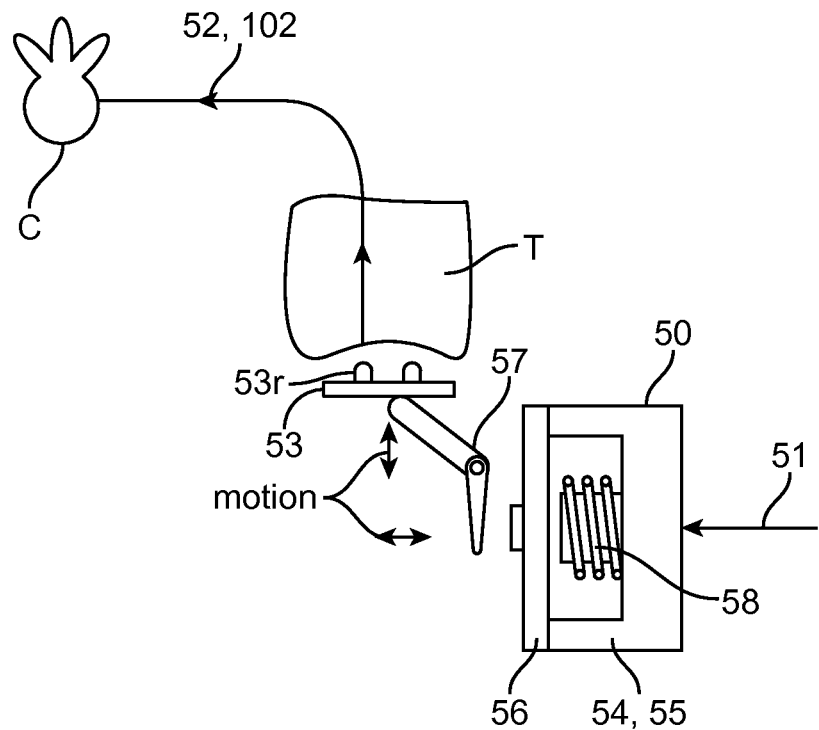
FIG. 6a is a side cut-away view showing an embodiment of the acoustic transducer comprising an electromagnetic driver, acoustical plate and a connecting lever.
Figure 6B:
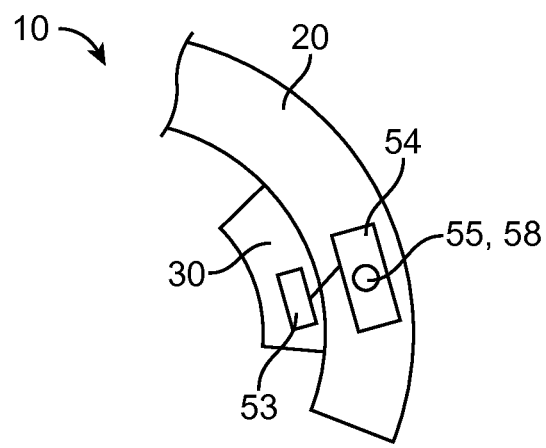
FIG. 6b is a top down view showing an embodiment of the acoustic transducer positioned in/on the mouthpiece.
Figure 6D:
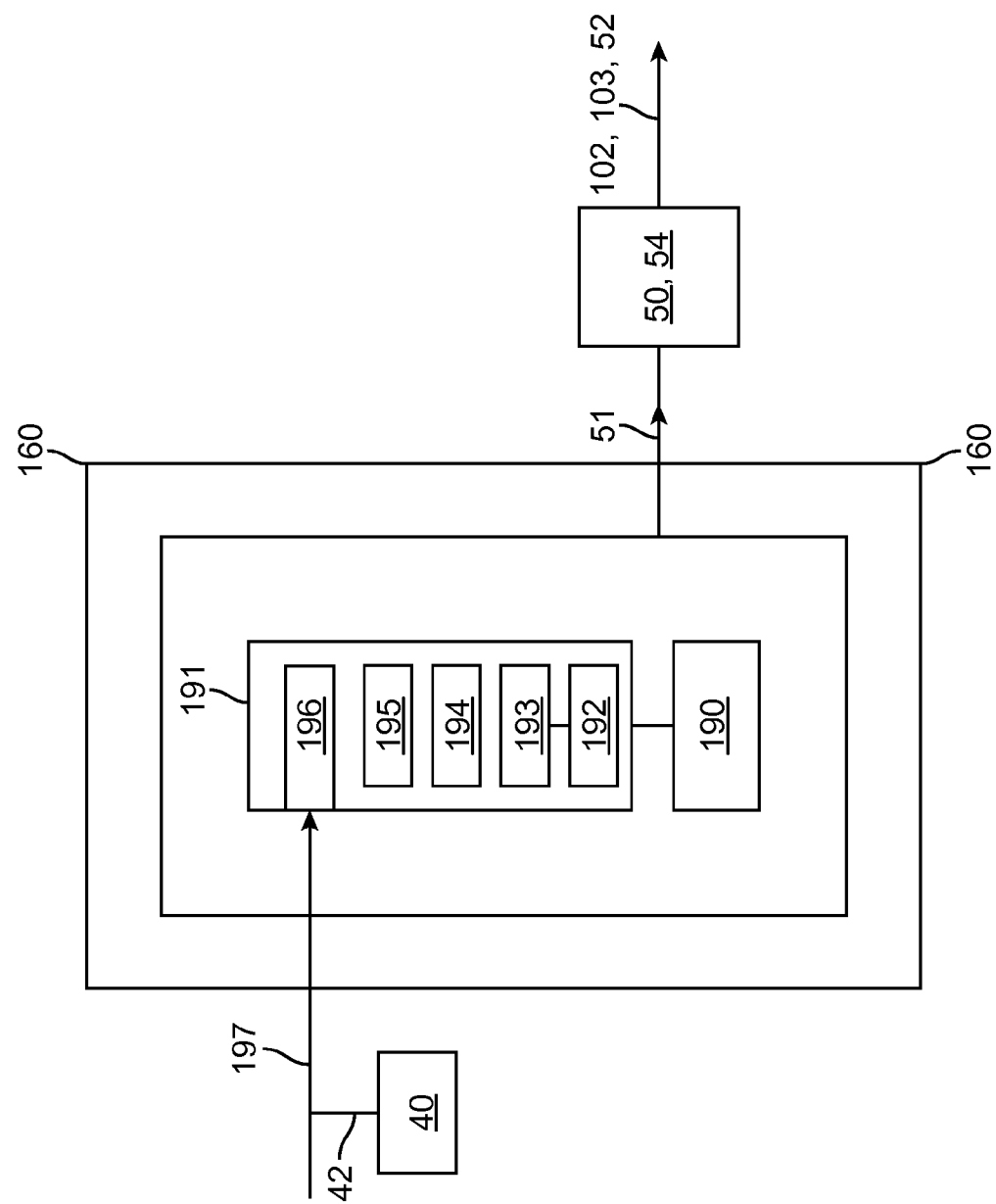
FIG. 6d is a block diagram showing the configuration and operation of an embodiment of a communication system for generating voice prompts and other messages that are delivered to the diver by embodiments of the acoustical transducer.
Figure 7B:
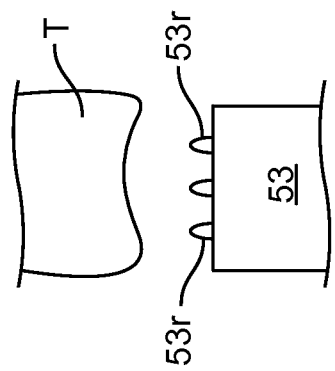
FIG. 7b is a side view illustrating an embodiment of the acoustical plate having conducting ridges.
Figure 7A:
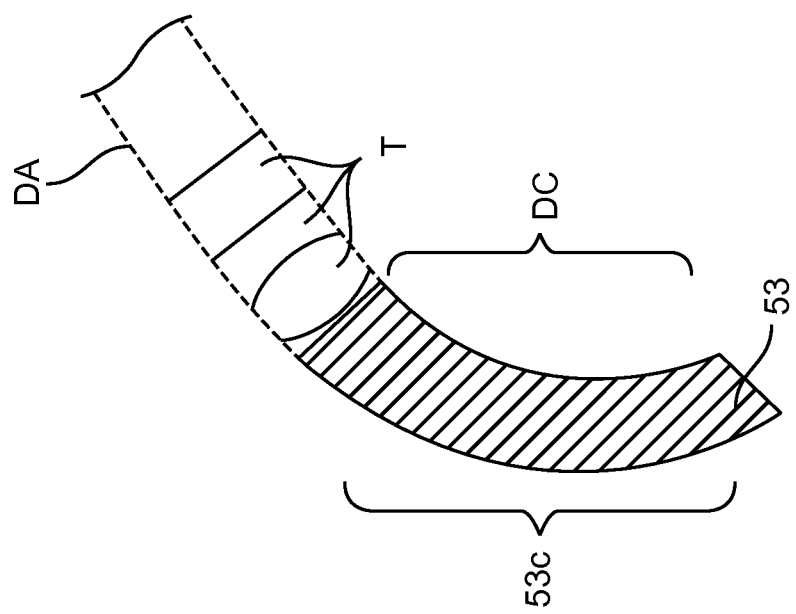
FIG. 7a is a top down view illustrating an embodiment of the acoustic plate having a curved shape corresponding to curvature of the diver's dental arches.
Figure 8:
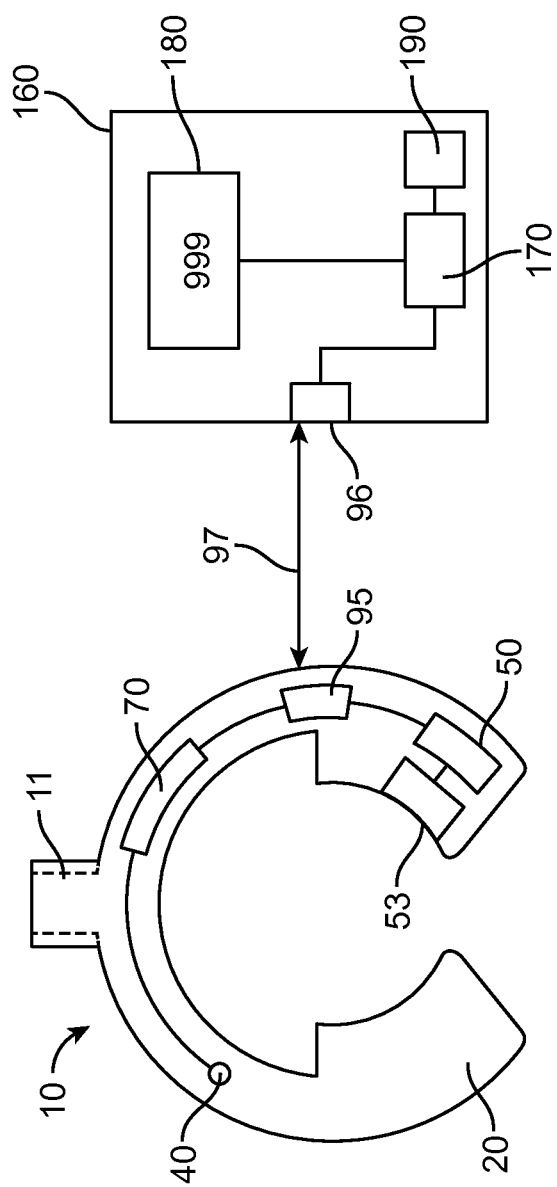
FIG. 8 illustrates an embodiment of the mouthpiece having a wireless communication device such an RF communication chip for communicating with a diver computer or other PWE device.
Figure 9A:
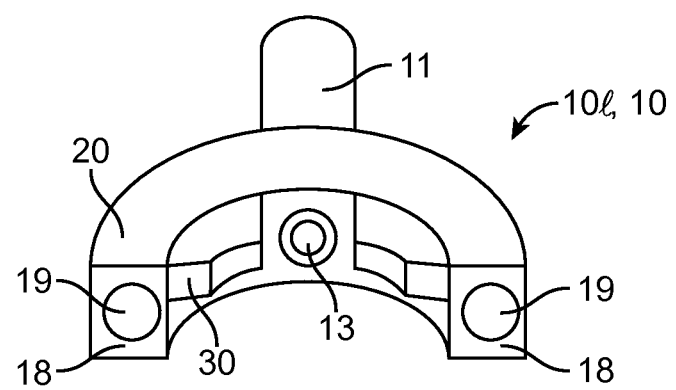
FIG. 9a is a cut away perspective view illustrating an embodiment of a multilayer mouthpiece having a rigid core and softer outer layer.
Figure 9B:
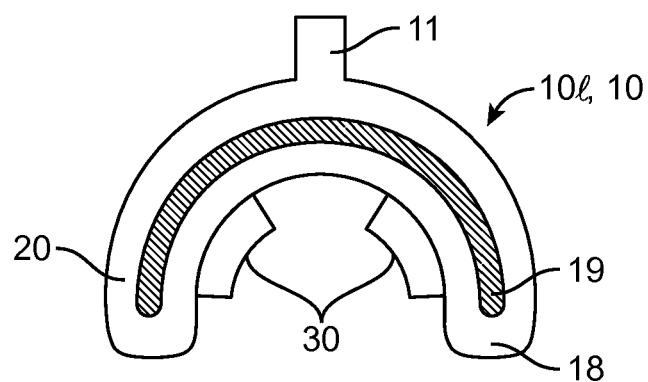
FIG. 9b is a cut away top down view illustrating an embodiment of a multilayer mouthpiece having a rigid core and softer outer layer.

Referring to FIGS. 6d and 10, in various embodiments, modules 190 can include a speech synthesizer module 191 which generates audio signals 51 corresponding to voices messages 102. In use, such embodiments allow the diver to perform a number of tasks and activities, including various mission critical tasks without having the distraction of having to look at an instrument.

Speech synthesis module 191 can comprise various speech synthesis algorithms known in the art. Additionally in various embodiments, speech synthesis module 191 can include the capability for generating audio signals 52, which correspond to a selected spoken voice 103. Spoken voice 103 can include for example, the diver's own voice, or another person's voice similar that used in aircraft navigation and control systems. One or both of modules 190 and 191 can include the capability for the diver 100 to record specific messages 102 in their own voice or that of another individual to allow module 191 to output those messages to the another diver 210. Further, modules 190 and 191 may also include the capability for the diver 200 to record a sufficient number of vocalizations (in their own voice or that of another individual) to allow module 191 to generate any spoken message 102 and not just those spoken by the diver 200 or other individual (e.g., the another diver 210). The techniques for generating voices 103 from such vocalizations can include various algorithms known in the speech synthesis arts, for example, various concatenation routines 192 using stored speech units 193 derived from the speaker's (e.g., the diver's) vocalizations. Such routines can be embedded within the programming of module 191 or they may be external.

In an additional or alternative embodiment, modules 190 and 191 can also include the ability for the diver 200 to fine tune the voice 103 to have selected acoustic properties (e.g., pitch, volume, etc. to their liking). Such voice selection capability can be achieved by the use of one or more algorithms incorporated into module 191 such as a pitch variation algorithm 194, rate variation algorithm 195 (and other adjustment algorithms known in the speech synthesis arts), which adjust audio signals 51 to produce the desired voice 103. In use, such embodiments allow the diver 200 to select a voice that they are most comfortable with and can mostly easily hear, particularly underwater. In some embodiments, device 160 and modules 190, and 191 can include the capability to allow the diver 200 to fine tune voice 103 while they are underwater with the mouthpiece 10 in place. Accordingly, in various embodiments device 160 can include various user input devices or other means 185 (e.g., knobs, touch screens, etc.) for making such adjustments.

In addition to manual adjustment of voice 103, in various embodiments device 160 can also include means for varying the acoustical characteristics of voice 103 depending upon variations in one or more conditions experienced by the divers so as to maintain the divers ability to hear messages 102 spoken by voice 103. Such conditions can include ambient noise levels, depth, water pressure and other like conditions. Accordingly modules 191 can include one or more control algorithms 196 (e.g., PI, PID, etc.) which operate using an input 197 which may comprise depth, pressure, ambient noise, etc. For the case of ambient noise levels, the input 197 can comprise signals 42 from microphone 42 or microphones coupled to device 160. In use, such embodiments allow the diver to continue to hear commands 102 from voice 103 during changes in their depth and in ambient noises level (e.g., from a passing boat) which may otherwise drown out or reduce the acoustic fidelity of the voice. Module 191 can also adjust voice 103 as well depending on the particular type of SCUBA 80, mask and mouthpiece used by the diver to account for variations in acoustical conduction and other acoustical characteristics.

Modules 191 can also be configured to modulate or otherwise adjust voice 103 to account for reduced levels of conduction by bone of higher acoustic frequencies. This can be accomplished for example through the use of pitch variations routines 195 which shifts the pitch of all or a portion of the frequency components of voice 103 to lower frequencies (e.g., make voice 103 deeper). In an additional approach for improving conduction through the bone of the higher frequency components of voice message 102 or other acoustic signals 52 various embodiments of the invention may use high pass signal routines implemented in hardware (e.g., a high pass filter coupled to op amp device) or in software by a module 198 running on one or both of processor 170 and 70. Such an approach (either in hardware or software) amplifies the higher frequency components of voice 103 or other acoustic signal 52 by a selected gain which can vary depending upon the frequency (e.g., more gain for higher frequencies). In one approach, the amount of the gain can be determined by doing sound conduction readings through the diver's skull and/or taking bone density readings using one or more bone densitometer instruments known in the art.

Device 160 can send signals 51 to mouthpiece 10 using a variety of modalities. For example, in various embodiments, device 160 can send audio signals 51 containing modulating or otherwise encoding a voice message 102 to mouthpiece 10 via wires 17, or alternatively may do so wireless using an RF other wireless communication device 96. In another embodiment, a second device 160' not directly coupled to mouthpiece 10 can be used to acoustically signal voice messages 102 to device 160 which is operatively coupled to mouthpiece 10 either via wires 17 or through use of RF communication devices 95 and 96.

As described above, various embodiments of the invention which generate spoken messages 102, for example using device 160, allow the diver to perform a number of tasks and activities, including various mission critical tasks without having the distraction of having to look at gauge or other instrument. Further, messages 102 can include not just data such as depth, remaining air, etc., but can include prompts for performing one or more operations or tasks. For example, in one or more embodiments, messages 102 can include spoken directions for reaching a desired location, such as a dive site, or the location of a dive boat or that of other divers. Specific commands in such embodiments can include without limitation, "swim up," "swim down," "bear to the right," "bear to the left,". This allows the diver to navigate to such locations while looking at their surrounding and/or when there is minimal lighting.

In one or more exemplary embodiments, dive computer 160 and communication system 5 can be configured to provide the diver 200 with voice messages 102 in the form of prompts for making a controlled ascent to the surface as to avoid the bends. Specifically, the dive computer could provide voice prompts telling the diver one or more of how long to remain at a particular depth during the ascent, what depth he is at, how long he has been at the depth and how soon before he can ascend to the next depth. The computer could also provide the diver with voice updates providing information such as their ascent rate and whether they need to stay longer or shorter at a particular depth depending on conditions. In addition to prompts and updates, the dive computer may also provide voice instructions of the entire ascent plan in advance allowing the diver to get a sense of the entire plan.

While in many embodiments, mouthpiece 10 is configured for use with a SCUBA 80, in other embodiments, the mouthpiece can also be configured for used with a snorkel or like apparatus, allowing a snorkeler to have two way voice communication with another snorkeler, diver 210 or ship 220. In such embodiments, the entire system 5, including communication device 100 can be contained in the mouthpiece 10. Further, in such embodiments, the connecting portion 11 can be sized and shaped to detachably connect to a standard sized snorkel, allowing the diver to attach the mouthpiece 10 to an off the shelf commercial snorkel and have a skin diving version of underwater communication system 5. In still other embodiments, mouthpiece 10 and system 5 can be adapted for use with virtually any breathing apparatus such as that used by fire and mine rescue personal, so as to allow two way voice communications with such apparatus.

Figure 12:
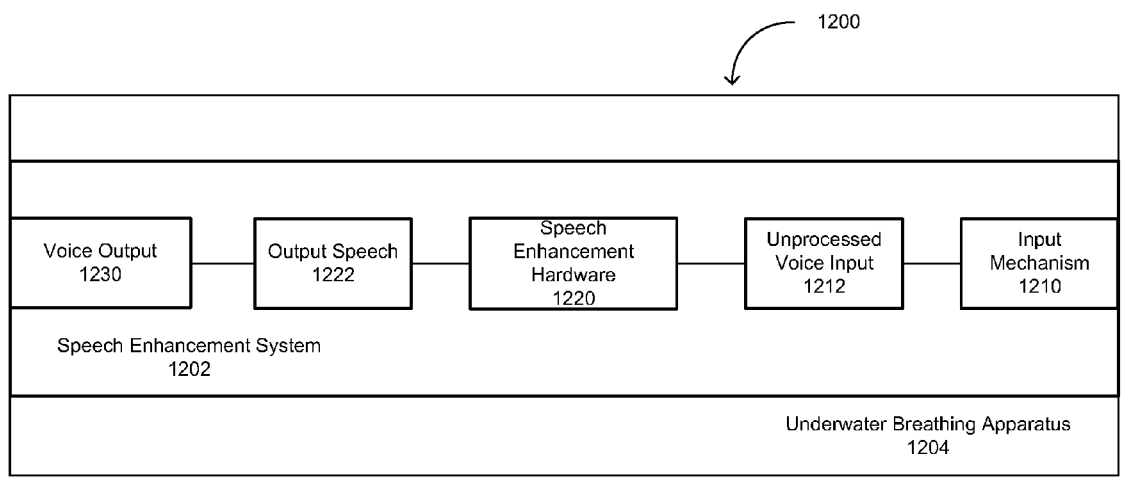
FIG. 12 is a simplified block diagram illustrating an embodiment of the system including speech enhancement hardware in an underwater breathing apparatus to receive and recognize voice input and to produce a voice output.

Referring to the embodiment in FIG. 12, a speech enhancement system 1202 may be provided with or as an integrated part of an underwater breathing apparatus 1200. Accordingly, a combined system of speech enhancement 1202 and underwater breathing apparatus 1200 can be devised in form of a scuba mask, mouthpiece, and/or add-on accessory.

In one embodiment, the underwater breathing apparatus 1200 includes a mouthpiece (for supplying oxygen) and mask (not shown). The apparatus 1200 may be integrated or combined with the speech enhancement system 1202. Speech enhancement system 1202 includes voice input mechanism 1210, speech enhancement hardware 1220, and voice output mechanism 1230. The input mechanism 1210 may correspond to a microphone, that is carried with the mask, mouthpiece or tubing. The input mechanism 1210 carries unprocessed voice input 1212 to the speech hardware 1220. The speech hardware 1220 can include programming and/or logic to process the voice input 1212.

In an underwater operational environment, voice input 1212 can be assumed to be hindered by factors such as the presence of the mouthpiece and/or other aspects of breathing using an underwater breathing device such as a SCUBA. Additionally, the user may be under physical stress or out of breath. In at least one implementation, speech enhancement hardware 1220 includes a processor coupled to the input mechanism. Speech enhancement hardware 1220 is configured to process a hindered voice input from the user.

Still further, in some embodiments, the speech hardware 1220 includes software or programming (e.g. a module) to recognize speech in its hindered form, and further to generate output that corresponds to a corrected or clarified version of the speech input. More specifically, the processor determines (or makes a probabilistic determination, i.e., a guess) at what the user is intending to say. The processor then signals a voice output 1222 that corresponds to corrected or clarified voice output (e.g. unhindered simulated or synthesized speech).

A voice output mechanism 1230 may receive the processed output 1222 of the speech hardware resources 1220. The output 1222 may be transmitted to the output mechanism 1230, which may reside outside of the diver's presence. For example, the output mechanism 1230 may be positioned with one or more other divers, surface ships, or to an underwater electronic device which generates voice messages for the diver.

In some implementations, the speech enhancement hardware 1220 includes one or more software modules that execute on processing resources (e.g., a microprocessor) of speech enhancement hardware 1220. The modules may be configured to facilitate performance of the system, such as production of voice output. Specific embodiments of speech enhancement hardware 1220 may include routines for recognizing input sounds (e.g., phonemes, consonants, etc.) or even whole words which may become garbled, slurred or otherwise incomprehensible, due e.g., the diver speaking with the breathing apparatus in place; matching those input sounds to voice output sounds; and then, generating a voice output based on those voice output sounds.

Voice output 1222 is produced by speech enhancement hardware 1220 and may constitute any appropriate form in context of speech enhancement system 1220. For example, in various embodiments the voice output 1222 may include an underwater signal to a receiver, electrical output, or a "blended" output comprising at least some of the voice input 1212 and synthesized or simulated portions. The voice output can be in the speaker's own voice (simulated), a synthesized voice or a combination thereof. The former can be implemented by having the speaker record a library of speech sounds (also known as phonemes) including consonants, vowels, diphthongs, prefixes (e.g., "pre"), and suffixes (e.g. "ing"). Furthermore, in various embodiments of methods for matching voice input to voice output, the diver can record pronunciation of each sound with and without the mouthpiece in place.

FIG. 13 illustrates an embodiment of speech enhancement comprising receiving voice input 1310, recognizing voice input speech 1320 and production of voice output 1330. The voice input 1310 may include hindered speech. Hindered speech includes speech that is garbled, slurred, impeded or otherwise made incomprehensible by the presence of an underwater breathing apparatus. Voice input recognition 1320 may be performed in a variety of ways, including those recited in the shown sub-steps of FIG. 13. For example, in Step 1322 (Word/Phrase Matching), a limited vocabulary may be preloaded. Also, speech recognition in Step 1322 may comprise recognizing speech based on context, partial sounds, or other corresponding features of the input speech which, in some embodiments, may be associated with the preloaded vocabulary. As an alternative or addition, Step 1320 may further comprise additional steps 1324 (e.g., use of a phoneme library) or waveform analysis 1326. Recognizing the voice input may further comprise assigning similarity factors for each characteristic, e.g., cadence 95% similar, volume 98% similar so that appropriate adjustments can be made for matching each characteristic. These characteristics can be weighted and combined into a composite characteristic with a composite similarity factor assigned as well. Such adjustments are particularly applicable for embodiments of the module utilizing a buffer to store the diver's speech, detect and process voice input to voice output and then blend the voice output into the voice input.

In an embodiment, for each recording of the input speech, the module generates and stores an audio signal waveform. The module can then use waveform/pattern recognition routines to identify that waveform and match it to a voice output. In such an embodiment, the diver may make several pronunciations for each sound so that the module can take an average of the voice input waveforms. For embodiments where the module uses waveform analysis, various curve fitting algorithms can be used to determine an overall fit between a sampled sound and a known input sound (e.g., a hindered input "th" sound corresponding to a known output "th" sound). Such an approach allows for improved accuracy in matching a voice input to a voice output. Further, the module may also include algorithms which adjust or otherwise take into account for the pressure and gas mixture that the diver is breathing (or other dive or breathing condition) together which may affect the waveform of the voice input.

Voice output step 1330 may include a variety of sub-steps, including the production of an underwater signal to a receiver as in Step 1332, electrical output as in Step 1334, or blended output as in Step 1336. Step 1336 may comprise the voice output including at least some of the voice input speech ("blending"). For example, where System 1300 includes memory caches or a buffer, Step 1336 may comprise storing the diver's voice input, substituting in the voice output sounds where appropriate and playing back the blended speech as a whole so that the listener does not hear any breaks in the diver's spoken messages. For example, a software module could be included in order to remove or otherwise minimize any pauses in the voice output so that the blended speech sounds continuous to the listener. In performing such an operation the module can take a sampling of the diver's speech to determine the average interval between words and then use that to look for gaps which are larger than the average interval. In an embodiment, system 1330 further includes routines for matching one or more characteristics of the voice output e.g., 1230, to the voice input e.g., 1212 so that the differences between the two are not readily discernible to the listener. Such characteristics can include without limitation the cadence or speed of the speech, pitch of the speech, volume of the speech (amplitude) or other related property.

The foregoing description of various embodiments of the invention has been presented for purposes of illustration and description. It is not intended to limit the invention to the precise forms disclosed. Many modifications, variations and refinements will be apparent to practitioners skilled in the art. For example, various embodiments of the communication system 5 including the mouthpiece 10 can be adapted for salt and fresh water environments, as well as deep dives (e.g., 60 to 200 meters (196.9 to 656.2 feet)) and cold water environments. They may also be adapted for use in closed circuit re-breathers in addition to standard SCUBA equipment.

Elements, characteristics, or acts from one embodiment can be readily recombined or substituted with one or more elements, characteristics or acts from other embodiments to form numerous additional embodiments within the scope of the invention. Moreover, elements that are shown or described as being combined with other elements, can, in various embodiments, exist as standalone elements. Hence, the scope of the present invention is not limited to the specifics of the described embodiments, but is instead limited solely by the appended claims.

What is claimed is:

1. A system for enhancing speech, the system comprising:
   an input mechanism to receive a first voice input from a first user;
   a communication device to transmit and receive acoustic signals across a liquid medium and to generate an electrical signal based on received acoustic signals;
   a transducer to convert the electrical signal into an acoustic output;
   wherein the transducer is configured to be coupled to the first user's upper teeth to generate audible sound in at least one of user's ears;
   and
   a processor configured to:
   receive the first voice input from the first user;
   recognize speech of the first user based on the first voice input; and
   output a respective acoustic vocal signal to the communication device based on the speech.

2. The system of claim 1, wherein the first voice input is a hindered voice from the first user wearing an underwater breathing apparatus.

3. The system of claim 2, wherein the underwater breathing apparatus comprises the input mechanism.

4. The system of claim 3, further comprising a self-contained underwater breathing apparatus (SCUBA), and wherein the underwater breathing apparatus is coupled to the SCUBA.

5. The system of claim 1, wherein the transducer is configured to conduct the acoustic output from the first user's upper teeth through the first user's skull to generate the audible sound, and wherein the communication device is further to process the electrical signal to increase conduction of the acoustic output at higher frequency levels.

6. The system of claim 1, wherein the received acoustic signals correspond to a second voice input from a second user.

7. The system of claim 1, wherein the processor is further configured to provide the respective acoustic vocal signal output in a synthesized voice.

8. The system of claim 7, wherein the processor is further configured to supplement the first voice input with a synthesized input to generate a composite audio output signal so as to provide the respective acoustic vocal signal output in the synthesized voice.

9. The system of claim 8, wherein the synthesized voice is selectable to vary in pitch or volume in response to an input.

10. The system of claim 9, wherein the input comprises a diving depth, ambient noise level, air supply gas mixture, air supply amount, air supply pressure, air supply flow rate, or rate of ascent by a diver.

* * * * *